March 23, 1965        R. E. MILLER ETAL        3,175,197
                      INHIBITOR LOGIC ARRAYS
Filed March 30, 1960                           6 Sheets-Sheet 1

INVENTORS
RAYMOND E. MILLER
JOHN PAUL ROTH

Thomas & Crickenberger
ATTORNEYS

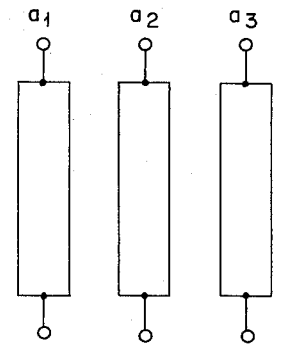
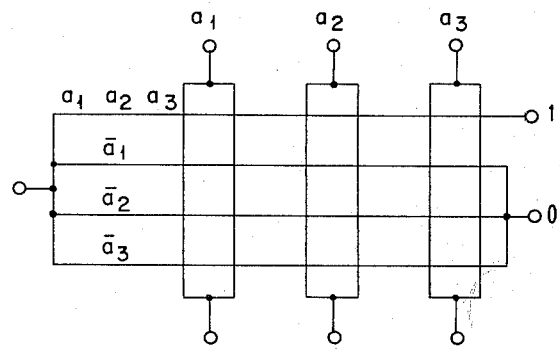
FIG. 17a    FIG. 17b
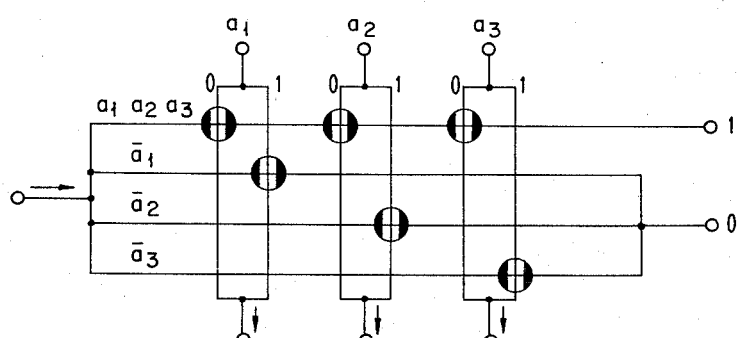
FIG. 17c
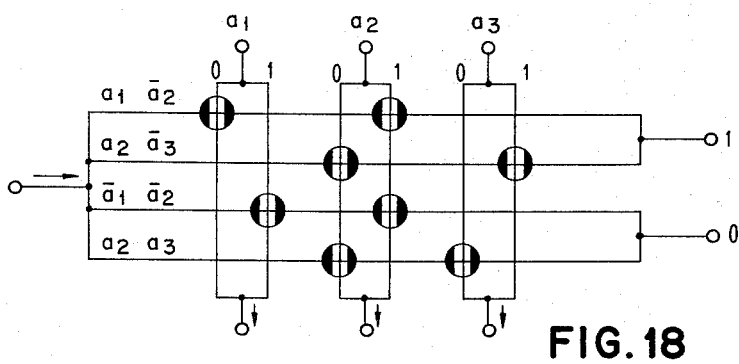
FIG. 18

United States Patent Office 3,175,197
Patented Mar. 23, 1965

3,175,197
INHIBITOR LOGIC ARRAYS
Raymond E. Miller, Yorktown Heights, and John Paul Roth, Ossining, N.Y., assignors to International Business Machines Corporation, New York, N.Y., a corporation of New York
Filed Mar. 30, 1960, Ser. No. 18,692
1 Claim. (Cl. 340—173.1)

The present invention relates to inhibitor logic arrays, and more particularly to rectangular array circuits using inhibitor logic.

In order to carry out logical operations in computer applications it is necessary to synthesize the circuitry required to accomplish these operations. Very often the problem of synthesis is not approached from a mathematical standpoint; however, it is highly desirable from a commercial standpoint to have a completely systematic procedure to the problem which therefore guarantees correct design.

In accordance with the present invention these features are attained by means of inhibitor logic embodied in rectangular array circuitry. The logical operations to be performed are first defined as polynomial functions in terms of a plurality of variables. An array of conductive wires is assembled with a set of lines corresponding to the variables in the function and a set of crossing lines corresponding to the terms in the function. At selected crossover points of the lines in the rectangular array thus constructed, inhibitor elements are disposed in accordance with the particular functions being synthesized. When the array is then selectively energized in accordance with the values of the variables, the inhibitor elements serve to indicate the function value by inhibiting all except a desired output line.

These and other features of the invention will be apparent from the description to follow and from the drawings in which:

FIG. 1b is a diagrammatic illustration of a cryotron element equivalent to the inhibitor of FIG. 1a;

Figure 16A:
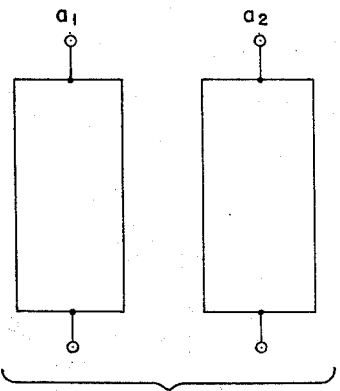
Figure 16B:
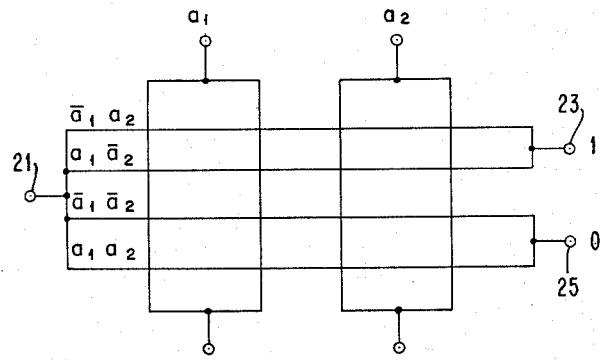
Figure 16C:
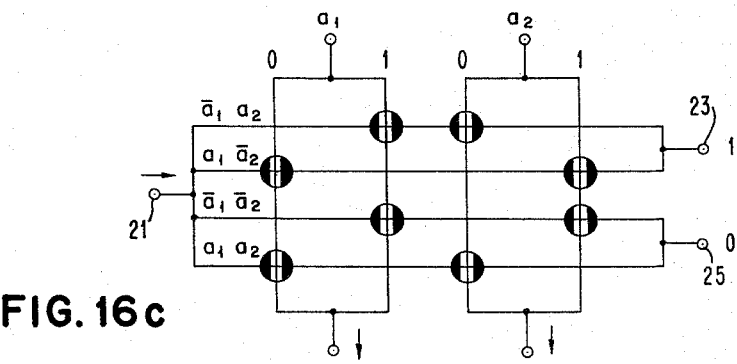

FIG. 16a through c is a step-by-step illustration of how an inhibitor array is synthesized for an "exclusive OR" circuit;

FIG. 17a through c is another step-by-step illustration of an inhibitor array constructed in accordance with the principles of the invention for an AND circuit; and FIG. 18 is a diagram of another inhibitor array constructed in accordance with the principles of the invention.

Figure 1A:
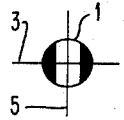
FIG. 1a is a symbolic representation of an inhibitor element.

Referring now to the drawings, FIG. 1a illustrates a basic inhibitor element 1. The inhibitor element 1 has a pair of lines 3 and 5 passing therethrough. The inhibitor 1 is located at the crossover point or point of interaction of these two lines. In the arrangement shown, a signal on line 5 will inhibit a signal from appearing on line 3. If there is a signal on line 3, then this signal will remain until line 3 is inhibited by a signal appearing on line 5. The particular form of the inhibitor in the illustration has no physical significance and is used as a logic symbol only.

Figure 1B:
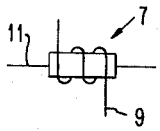

FIG. 1b shows a cryotron device which may be employed as the inhibitor element 1 of FIG. 1a. The cryotron 7 has a control winding 9 and a gate line 11. The gate line of the cryotron is constructed of a material which is in a superconductive state at the operating temperature of the cryotron in the absence of a magnetic field. The gate line is driven resistive (non-superconducting or normal condition) by a magnetic field produced when a current greater than a predetermined minimum exists in its control winding 9. Thus, the cryotron utilizes the fact that the superconductive transition of a material depends upon both temperature and the applied electromagnetic field. The inherent characteristics of such a device enable it to perform switching and inhibiting functions which are readily adaptable to computer applications.

The cryotron 7 may be constructed of any suitable material having the required operating characteristics. The gate line must have the property of transferring from its superconductive to its normal state under the influence of a magnetic field, and the material tin has been found satisfactory for this application. The control winding 9 and the connections between the various components of associated circuitry (not shown) must be fabricated from a superconductor material which remains in its superconductive state under all conditions of circuit operation. An example of such a material is lead. The construction of the cryotron, together with the types of materials employed, may be understood more readily by referring to the article by Dudley A. Buck, "The Cryotron—A Superconductive Computer Component," Proceedings of the IRE, pp. 482–493, April 1956.

The use of inhibitor logic is particularly applicable to cryogenic circuits, and, therefore, the cryotron has been suggested as a suitable inhibitor device because the cryotron is a basic superconductive element. It will be understood, however, that other equivalent devices may be used as the inhibitor elements in the circuits constructed in accordance with the present invention.

The elementary inhibitor operation of the device of FIG. 1 can be extended to circuits constructed to carry out specialized logical operations. A convenient way of expressing these operations is in terms of Boolean functions. In order to utilize these Boolean functions in accordance with the invention they must be stated in disjunctive normal form. This means that the function is expressed as a disjunction of terms, each term of which is a conjunction of variables or their negations. In this form no variable can occur twice in any term. For example, the function $$f_1(a_1,a_2,a_3) = a_1 a_2 \vee a_2 \bar{a}_3$$

is in normal form, while the functions $$f_2(a_1,a_2,a_3) = a_1(a_2 \vee \bar{a}_3)$$

and $$f_3(a_1,a_2,a_3) = a_1 a_2 \vee a_1 a_3 \bar{a}_3$$

are not. In order to have a complete expression it is necessary to have both the function and the negation of the function expressed in disjunctive normal form. When both the function and the negation of the function are expressed in disjunctive normal form, then the complete expression thus obtained is called the supernormal form. It is this supernormal form that is used in constructing inhibitor logic circuitry.

Figure 2:
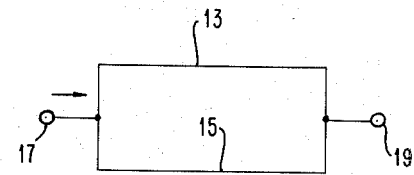
FIG. 2 is a diagrammatic illustration of a superconducting wire pair utilized in the present invention.
Figure 3:
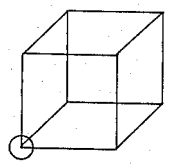
FIGS. 3 through 15 are illustrations of the 3-cube configurations together with representative minimum circuits for the thirteen equivalence classes of three-variable supernormal form circuits.
Figure 3:
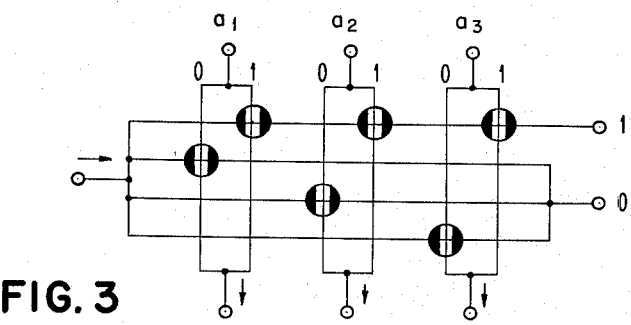
Figure 4:
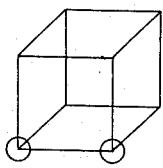
Figure 4:
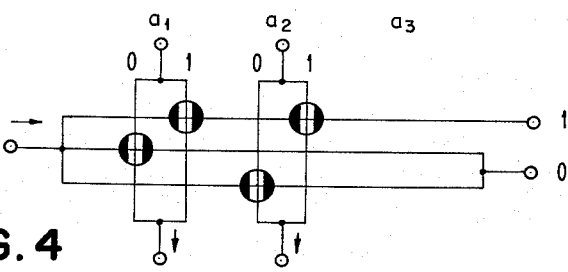
Figure 5:
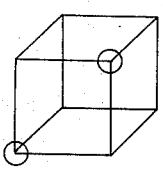
Figure 5:
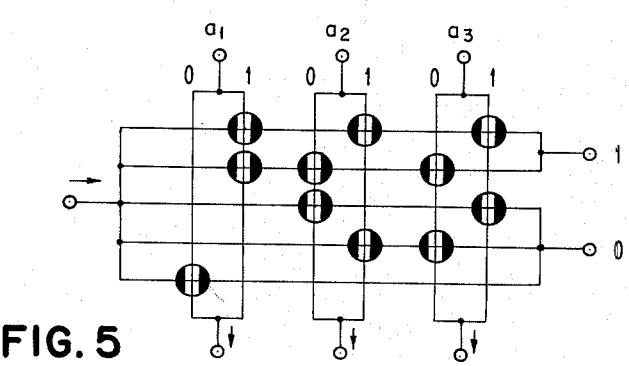
Figure 6:
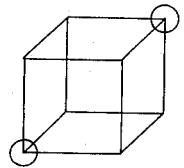
Figure 6:
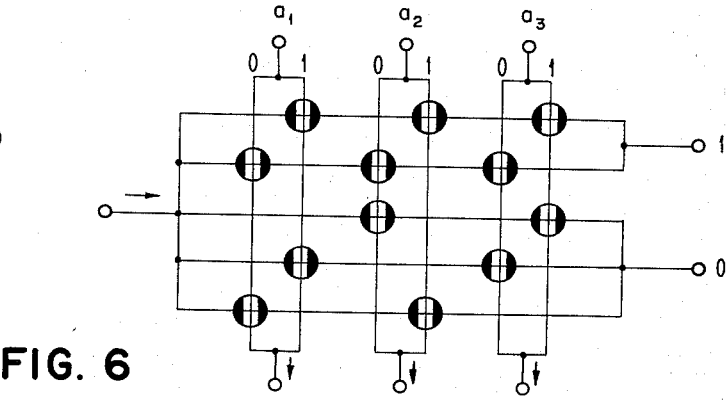
Figure 7:
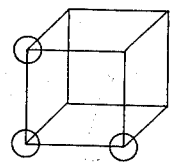
Figure 7:
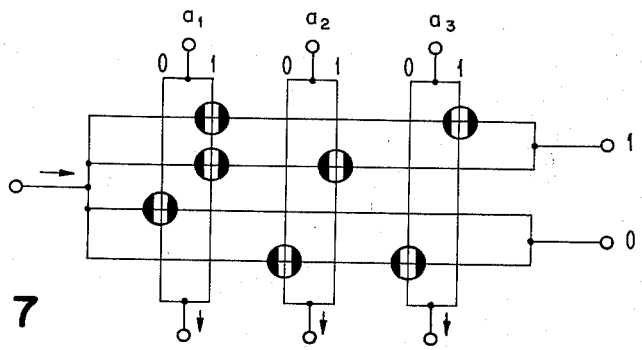
Figure 8:
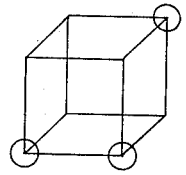
Figure 8:
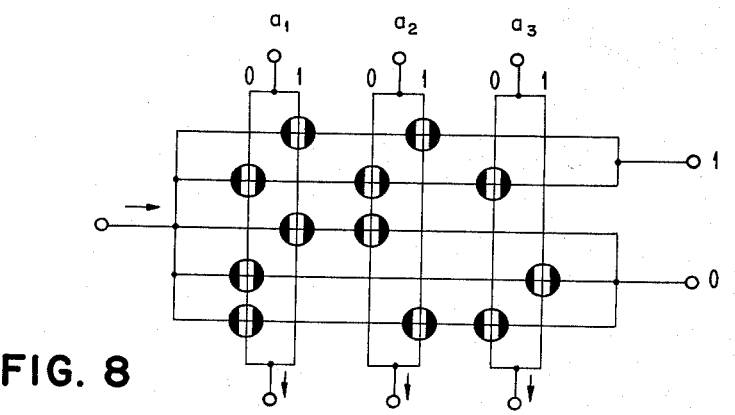
Figure 9:
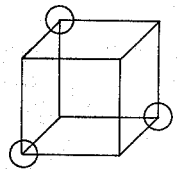
Figure 9:
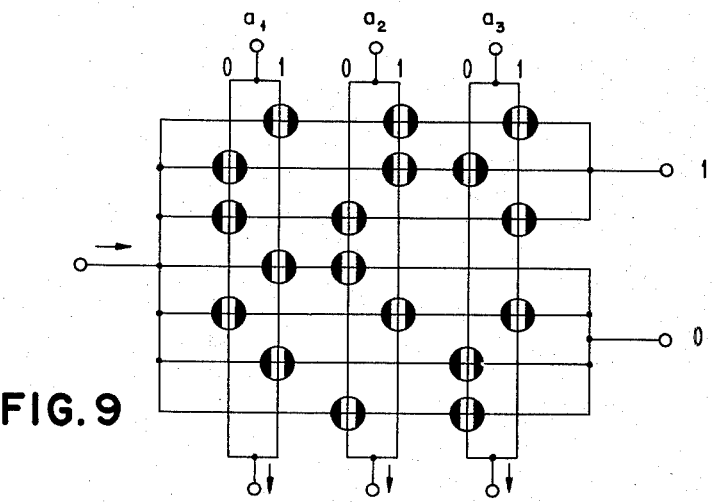
Figure 10:
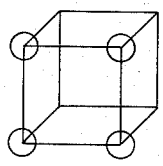
Figure 10:
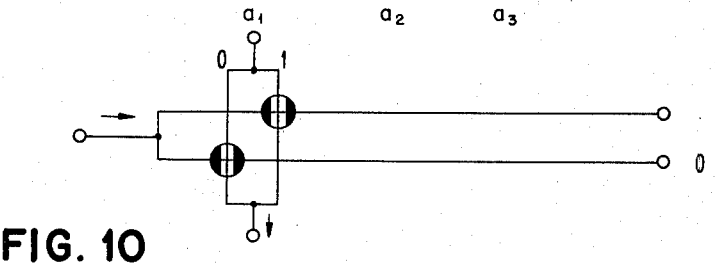
Figure 11:
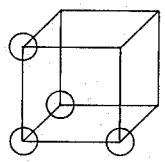
Figure 11:
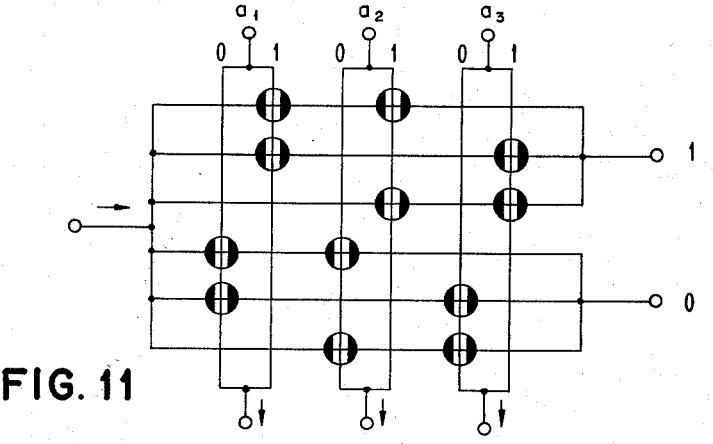
Figure 12:
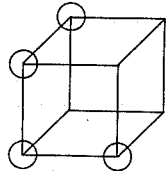
Figure 12:
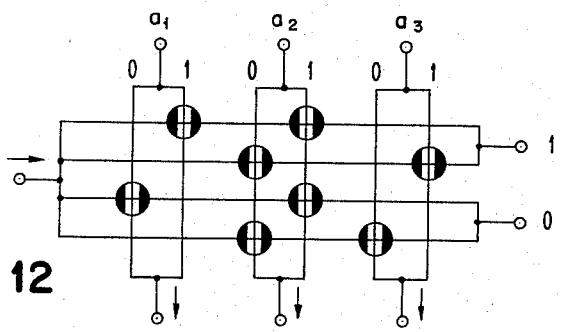
Figure 13:
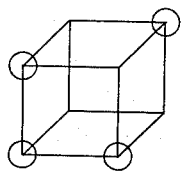
Figure 13:
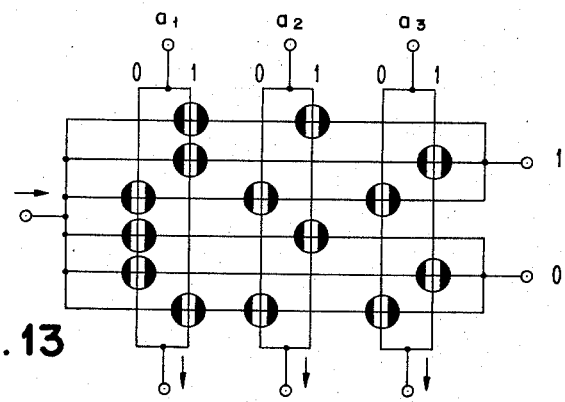
Figure 14:
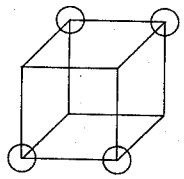
Figure 14:
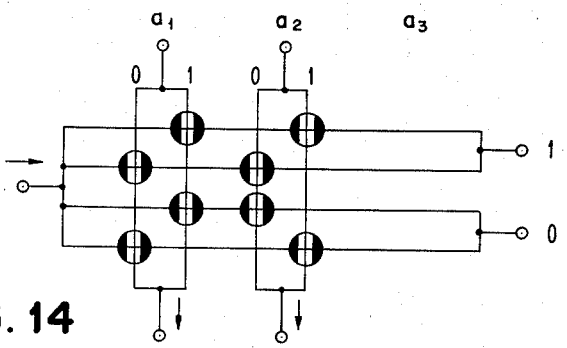
Figure 15:
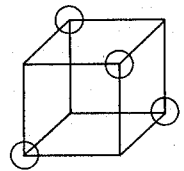
Figure 15:
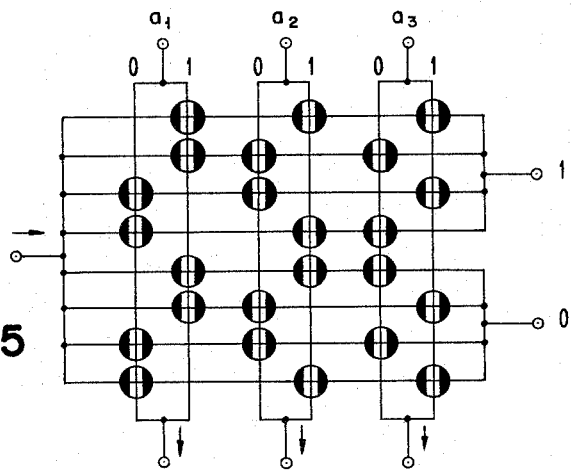

It will be necessary to assume that any variable of the form $a_i$ (where $i$ indicates the particular variable), as well as the function value itself, may be indicated by current in one of two wires. A pair of these wires are shown in FIG. 2 of the drawings and are labelled 13 and 15, respectively. In accordance with the principles of this invention these wires 13 and 15 are superconductors, and a current initiating at terminal 17 may exist in either wire 13 or wire 15, but not both. This is accomplished by controlling the conductivity of these wires by inhibitor elements such as shown in FIG. 1a. Thus, there is always current between points 17 and 19, but this current may be selectively diverted through either conductor 13 or 15.

In order to illustrate the process for synthesizing logic circuitry in accordance with the present invention it will be assumed that a given function $f$ and its negation $\bar{f}$ are in the supernormal form with the expression for $f$ having $r$ number of terms and the expression for $\bar{f}$ having $s$ number of terms. The supernormal form circuit for these expressions (assuming a binary form radix=2) would be constructed as follows:

(1) Provide a number of pairs of lines, such as the pair shown in FIG. 2, equal to the number of variables in $f$;

(2) Cross the pairs of lines with $r+s$ single wires;

(3) Connect on one end all $r+s$ wires to a current source;

(4) Connect $r$ of the wires on the other end to a single wire to represent the One state of the function $f$. Connect the remaining $s$ wires to a single wire to represent the Zero state of the function $f$;

(5) Associate one of the $r$ wires with each term in the given normal form representation of $f$, and with each term of $\bar{f}$, associate one of the $s$ wires; and (6) For any given term, if $a_i$ appears, place an inhibitor element so that current on the Zero side of the pair of lines for $a_i$ will inhibit current in the line corresponding to that term. If $\bar{a}_i$ occurs, place an inhibitor element so that current on the One side of $a_i$ will inhibit current in the line corresponding to that term. If neither $a_i$ nor $\bar{a}_i$ occurs in the term, place no inhibitors where the pair of lines for $a_i$ cross the line corresponding to that term.

The procedure described above is applicable to the designing of supernormal form rectangular array circuits for functions containing any number of variables. At this point it will be helpful to discuss the minimum circuit arrangement for three-variable functions. There are $2^{2^3}=256$ possible three-input functions of which two are constants and require no circuitry. The remaining 254 functions may be grouped into thirteen different equivalence classes. Since it is possible to represent Boolean functions by circled and uncircled vertices of an $n$-cube, the representation of functions on $n$-cubes is useful in describing the classes of equivalent functions.

The vertices of an $n$-cube may be associated with the canonical terms in $n$-variable Boolean functions such that each vertex is labelled with the coordinates $a_1, a_2, \ldots, a_n$. For a Boolean function $f(a_1, a_2, \ldots, a_n)$ a vertex of the $n$-cube is circled if the coordinate values of that vertex render the function equal to one. Two functions $f_1$ and $f_2$ will be in the same equivalence class if the cube representing $f_2$ can be rotated and reflected such that (a) the circled vertices appear in like positions for both cubes representing $f_1$ and $f_2$, or (b) each circled vertex on the cube for $f_2$ corresponds to an uncircled vertex on the cube for $f_1$.

In the supernormal form circuitry, if two functions $f_1$ and $f_2$ are in the same equivalence class and a circuit is constructed for the function $f_1$, then the same circuit may be used to realize the function $f_2$ by simply permuting the inputs and changing the sense of the Zero and One wires on the inputs corresponding to the rotations and reflections of the cube which were required. If the equivalence was established on the basis of a circled vertex corresponding to an uncircled vertex then it will also be necessary to change the sense of the Zero and One output wires.

In addition to the supernormal form discussed above in which the function and its negation are expressed algebraically in terms of variables, the supernormal form circuitry may be expressed in cubical language. In cubical language $C_1$ and $C_0$ are called covers of the function and its negation, respectively, and each term in the cover is called a cube. The terms of the covers may be represented as an $n$-tuple of Zeros, Ones and X's. If a particular variable $a_i$ appears in the term, then the $i$th coordinate of this $n$-tuple is a One; if the negation $\bar{a}_i$ appears then the $i$th coordinate is a Zero, and if neither $a_i$ or its negation $\bar{a}_i$ appears then the $i$th coordinate is an X. For example, the function $f=a_1 a_2 a_3$ and its negation may be expressed algebraically and in cubical language as follows:

$$f = a_1 a_2 a_3 = (1\ 1\ 1)$$
$$\bar{f} = \bar{a}_1 \vee \bar{a}_2 \vee \bar{a}_3 = \begin{matrix}(0\ X\ X)\\(X\ 0\ X)\\(X\ X\ 0)\end{matrix}$$

It will now be appreciated that logic circuitry can be synthesized using the cubical language expression of the supernormal form as well as the algebraic expression. In cubical language the procedure in finding the supernormal form representation of a function is to:

(1) Find a minimum normal form representation for the function and its negation; that is, find the minimum covers $C_1$ and $C_0$;

(2) Represent the cubes in $C_1$ by wires in parallel with each other (one wire for each cube);

(3) Cross these cube wires with a pair of wires for each variable appearing in the function; and (4) For each Zero coordinate appearing in a cube, place an inhibitor on the One side of the variable wire pair at the crossover or intersection point with the wire representing the cube. For each One appearing as a coordinate in a cube, place an inhibitor on the Zero side of the pair of wires representing the variable where it crosses the wire representing the cube. If the coordinate of the cube is an X do not place any inhibitors at the intersections of the variable wire pair and the cube wire.

The following table shows the distribution of the various functions in the equivalence classes and the corresponding circled vertices of the three-cube configuration representing the equivalence class.

*The equivalence classes and their functions*

| Equivalence Class | Number of Functions | Number of Circled Vertices on 3-cube Configuration | Representative Function in Cubical Terminology | Representative Function in Boolean Terminology |
|---|---|---|---|---|
| 1 | 16 | 1 | $f_1 = (0\ 0\ 0) = \bar{a}_1 \bar{a}_2 \bar{a}_3$ | |
| | | | $\bar{f}_1 = \begin{matrix}(1\ X\ X)\\(X\ 1\ X)\\(X\ X\ 1)\end{matrix}$ | $= a_1 \vee a_2 \vee a_3$ |
| 2 | 24 | 2 | $f_2 = (0\ 0\ X) = \bar{a}_1 \bar{a}_2$ | |
| | | | $\bar{f}_2 = \begin{matrix}(1\ X\ X)\\(X\ 1\ X)\end{matrix}$ | $= a_1 \vee a_2$ |
| 3 | 24 | 2 | $f_3 = \begin{matrix}(0\ 0\ 0)\\(0\ 1\ 1)\end{matrix}$ | $= \bar{a}_1 \bar{a}_2 \bar{a}_3 \vee \bar{a}_1 a_2 \bar{a}_3$ |
| | | | $\bar{f}_3 = \begin{matrix}(X\ 1\ 0)\\(X\ 0\ 1)\\(1\ X\ X)\end{matrix}$ | $= a_2 \bar{a}_3 \vee \bar{a}_2 a_3 \vee a_1$ |
| 4 | 8 | 2 | $f_4 = \begin{matrix}(0\ 0\ 0)\\(1\ 1\ 1)\end{matrix}$ | $= \bar{a}_1 \bar{a}_2 \bar{a}_3 \vee a_1 a_2 a_3$ |
| | | | $\bar{f}_4 = \begin{matrix}(X\ 1\ 0)\\(0\ X\ 1)\\(1\ 0\ X)\end{matrix}$ | $= a_2 \bar{a}_3 \vee \bar{a}_1 a_3 \vee a_1 \bar{a}_2$ |
| 5 | 48 | 3 | $f_5 = \begin{matrix}(0\ X\ 0)\\(0\ 0\ X)\end{matrix}$ | $= \bar{a}_1 \bar{a}_3 \vee \bar{a}_1 \bar{a}_2$ |
| | | | $\bar{f}_5 = \begin{matrix}(1\ X\ X)\\(X\ 1\ 1)\end{matrix}$ | $= a_1 \vee a_2 a_3$ |
| 6 | 48 | 3 | $f_6 = \begin{matrix}(0\ 0\ X)\\(1\ 1\ 1)\end{matrix}$ | $= \bar{a}_1 \bar{a}_2 \vee a_1 a_2 a_3$ |
| | | | $\bar{f}_6 = \begin{matrix}(0\ 1\ X)\\(1\ X\ 0)\\(1\ 0\ 1)\end{matrix}$ | $= \bar{a}_1 a_2 \vee a_1 \bar{a}_3 \vee a_1 \bar{a}_2 a_3$ |
| 7 | 16 | 3 | $f_7 = \begin{matrix}(0\ 0\ 0)\\(1\ 0\ 1)\\(1\ 1\ 0)\end{matrix}$ | $= \bar{a}_1 \bar{a}_2 \bar{a}_3 \vee a_1 \bar{a}_2 a_3 \vee a_1 a_2 \bar{a}_3$ |

The equivalence classes and their functions—Continued

| Equivalence Class | Number of Functions | Number of Circled Vertices on 3-cube Configuration | Representative Function in Cubical Terminology | Representative Function in Boolean Terminology |
|---|---|---|---|---|
| | | | $\bar{f}_7 = \begin{pmatrix} 0 & 1 & X \\ 1 & 0 & 0 \\ 0 & X & 1 \\ X & 1 & 1 \end{pmatrix} = \bar{a}_1 a_2 \vee a_1 \bar{a}_2 \bar{a}_3 \vee \bar{a}_1 a_3 \vee a_2 a_3$ | |
| 8 | 6 | 4 | $f_8 = (0\ X\ X) = \bar{a}_1$ | |
| | | | $\bar{f}_8 = (1\ X\ X) = a_1$ | |
| 9 | 8 | 4 | $f_9 = \begin{pmatrix} 0 & 0 & X \\ 0 & X & 0 \\ X & 0 & 0 \end{pmatrix} = \bar{a}_1 \bar{a}_2 \vee \bar{a}_1\ \bar{a}_3 \vee \bar{a}_2 \bar{a}_3$ | |
| | | | $\bar{f}_9 = \begin{pmatrix} 1 & 1 & X \\ 1 & X & 1 \\ X & 1 & 1 \end{pmatrix} = a_1 a_2 \vee a_1 a_3 \vee a_2 a_3$ | |
| 10 | 24 | 4 | $f_{10} = \begin{pmatrix} 0 & 0 & X \\ X & 1 & 0 \end{pmatrix} = \bar{a}_1 \bar{a}_2 \vee a_2 \bar{a}_3$ | |
| | | | $\bar{f}_{10} = \begin{pmatrix} 1 & 0 & X \\ X & 1 & 1 \end{pmatrix} = a_1 \bar{a}_2 \vee a_2 a_3$ | |
| 11 | 24 | 4 | $f_{11} = \begin{pmatrix} 0 & 0 & X \\ 0 & X & 0 \\ 1 & 1 & 1 \end{pmatrix} = \bar{a}_1 \bar{a}_2 \vee \bar{a}_1 \bar{a}_3 \vee a_1 a_2 a_3$ | |
| | | | $\bar{f}_{11} = \begin{pmatrix} 1 & 0 & X \\ 1 & X & 0 \\ 0 & 1 & 1 \end{pmatrix} = a_1 \bar{a}_2 \vee a_1 \bar{a}_3 \vee \bar{a}_1 a_2 a_3$ | |
| 12 | 6 | 4 | $f_{12} = \begin{pmatrix} 0 & 0 & X \\ 1 & 1 & X \end{pmatrix} = \bar{a}_1 \bar{a}_2 \vee a_1 a_2$ | |
| | | | $\bar{f}_{12} = \begin{pmatrix} 0 & 1 & X \\ 1 & 0 & X \end{pmatrix} = \bar{a}_1 a_2 \vee a_1 \bar{a}_2$ | |
| 13 | 2 | 4 | $f_{13} = \begin{pmatrix} 0 & 0 & 0 \\ 0 & 1 & 1 \\ 1 & 1 & 0 \\ 1 & 0 & 1 \end{pmatrix} = \bar{a}_1 \bar{a}_2 \bar{a}_3 \vee \bar{a}_1 a_2 a_3 \vee a_1 a_2 \bar{a}_3 \vee a_1 \bar{a}_2 a_3$ | |
| | | | $\bar{f}_{13} = \begin{pmatrix} 0 & 0 & 1 \\ 0 & 1 & 0 \\ 1 & 1 & 1 \\ 1 & 0 & 0 \end{pmatrix} = \bar{a}_1 \bar{a}_2 a_3 \vee \bar{a}_1 a_2 \bar{a}_3 \vee a_1 a_2 a_3 \vee a_1 \bar{a}_2 \bar{a}_3$ | |

FIGS. 3 to 15 of the drawings illustrate the three-cube configurations of the various equivalence classes together with the representative minimum circuit for each class. These circuits may be synthesized from the representative functions in the above table using either the algebraic or the cubical procedure previously explained.

In order to illustrate more clearly the manner in which a circuit may be synthesized, FIG. 16a through c illustrates the synthesis of an "exclusive OR" logical operation.

The supernormal form expression for this logic in Boolean terminology is $f = \bar{a}_1 a_2 \vee a_1 \bar{a}_2$ and $\bar{f} = \bar{a}_1 \bar{a}_2 \vee a_1 a_2$. Following the steps previously outlined this circuitry would be synthesized as follows:

(1) Provide two pairs of lines, one pair for each of the variable $a_1$ and $a_2$;

(2) Cross the two pairs of lines with four single wires, one for each of the terms $\bar{a}_1 a_2$, $a_1 \bar{a}_2$, $\bar{a}_1 \bar{a}_2$, and $a_1 a_2$;

(3) Connect together all of the single wires on the left side and provide a terminal 21 to be connected to a current source;

(4) Connect together the lines for the terms $\bar{a}_1 a_2$ and $a_1 \bar{a}_2$ on the right side to provide a common output terminal 23 representing the One state of the function $f$. Connect together the lines representing the terms $\bar{a}_1 \bar{a}_2$ and $a_1 a_2$ to a common terminal 25 to serve as the Zero state of the function $f$.

(5) Along the line for $\bar{a}_1 a_2$ place an inhibitor where this line crosses the One side of input $a_1$ and also where the line crosses the Zero side of input $a_2$. This will produce an output along the line $\bar{a}_1 a_2$ when the input $a_1$ is conducting on the Zero side and the input $a_2$ is conducting on the One side. Similarly, along line $a_1 \bar{a}_2$ place inhibitors where this line crosses the Zero side of input $a_1$ and the One side of input $a_2$. Place inhibitors along the line $\bar{a}_1 \bar{a}_2$ where this line crosses the One side of input $a_1$ and the One side of input $a_2$. Place inhibitors along the line $a_1 a_2$ where this line crosses the Zero side of input $a_1$ and the Zero side of input $a_2$.

It will be seen from this array that an output will be produced on the One side at terminal 23 when either $a_1$ is Zero and $a_2$ is One or when $a_1$ is One and $a_2$ is Zero. A Zero output wil be obtained when the inputs $a_1$ and $a_2$ are either both Zero or both One. Thus, the circuit in fact realizes an exclusive OR function.

Referring now to FIG. 17a through c another specific example will be treated in order to illustrate more clearly the method by which the circuitry is constructed. Assume that it is desired to synthesize the logic array for an AND operation having a supernormal form representation of $f = a_1 a_2 a_3$ and $\bar{f} = \bar{a}_1 \vee \bar{a}_2 \vee \bar{a}_3$. In FIG. 17a three separate pairs of vertical wires are provided for each of the variables $a_1$, $a_2$ and $a_3$. Since $f$ has one term and $\bar{f}$ has three terms, four horizontal crossing wires are provided as shown in FIG. 17b with all four horizontal wires being connected together on the left and the lower three wires being connected together on the right. FIG. 17c shows the manner in which the inhibitors are placed. Corresponding to the term $a_1 a_2 a_3$ there are three inhibitors placed on the first horizontal wire so that current in the Zero side of any wire pair representing a variable will inhibit current in this wire. Corresponding to each term of $\bar{f}$, a single inhibitor is placed on each wire on the One side of the variable which appears in the term. The top wire in the horizontal position forms the One output while the three bottom wires connected together form the Zero output. There will be a One output if $a_1 = a_2 = a_3 = 1$; that is, the circuit in fact realizes the AND function of three variables.

FIG. 18 shows the supernormal form circuit for the functions $f = a_1 \bar{a}_2 \vee a_2 \bar{a}_3$ and $\bar{f} = \bar{a}_1 \bar{a}_2 \vee a_2 a_3$. Since there are three variable $a_1$, $a_2$ and $a_3$, there must be three pairs of vertical wires, and since there are four terms in the two functions, there must be four horizontal wires crossing the three pairs of vertical wires. Each function has two terms so the top and bottom pairs, respectively, of the horizontal wires are connected together. The first term of the function $f$ is $a_1 \bar{a}_2$, so inhibitors are placed along the top wire which corresponds to that term where the Zero line from the $a_1$ input and the One line from the $a_2$ input cross. Similarly, the second horizontal line represents the term $a_2 \bar{a}_3$, so an inhibitor element is placed at each of the crossover points of this line with the Zero input line from the $a_2$ input and the One line from the $a_3$ input. It is believed that the method followed in synthesizing this circuit will now be apparent.

The method of synthesis described can be extended to any desired radix and the adaptation to higher bases would merely be a logical extension of the theory here presented and described. It will be understood that the normal forms utilized in synthesizing the circuitry should be in their minimum form, that is, the variables and terms should be simplified as much as possible to assure that the circuits synthesized will contain the least possible number of hardware components. The circuits constructed in accordance with the invention are particularly applicable to cryogenic operation, although it will be understood that the invention is not limited to cryogenic devices.

While the invention has been illustrated and described in connection with certain arrangements, it is to be understood that variations and changes may be made without departing from the invention as set forth in the claim.

What is claimed is:

A cryogenic rectangular array utilizing inhibitor logic for performing a binary logical operation definable as a polynomial function in terms of a plurality of variables $a_i$, said function and its negation being expressed in disjunctive normal form as a disjunction of terms, each term of which is a conjunction of variables or their negations, there being $r$ number of terms in the expression for the function and $s$ number of terms in the expression for the negation of the function, said array consisting of a number of pairs of superconductors equal to the number of variables in the function and disposed along one axis of the array, each pair having a superconductor representing a One state and a superconductor representing a Zero state, a number equal to $r+s$ of single superconductors disposed along the other axis of the array to form crossover points, a current source connected to one end of all $r+s$ single superconductors, the other ends of all $r$ superconductors being connected to a first common superconductor to represent the One state of the function and the other ends of all $s$ superconductors being connected to a second common superconductor to represent the Zero state of the function, and cryotron inhibitor elements selectively disposed at crossover points of the array in accordance with the following conditions:

(1) Where any given term contains a particular variable $a_i$, an inhibitor element is located so that current on the Zero side of the pair of superconductors corresponding to the variable $a_i$ will inhibit current in the single superconductor corresponding to that given term, (2) Where any given term contains a particular variable $\bar{a}_i$, an inhibitor element is located so that current on the One side of the pair of superconductors corresponding to the variable $\bar{a}_i$ will inhibit current in the single superconductor corresponding to that given term, and means to selectively energize the pairs of conductors representing the variables to inhibit certain of the single superconductors, whereby any uninhibited superconductors serve to indicate a function value.

References Cited by the Examiner
UNITED STATES PATENTS

| | | | |
|---|---|---|---|
| 2,734,183 | 2/56 | Rajchman | 340—174 |
| 3,047,230 | 7/62 | Anderson | 340—173.1 |
| 3,069,086 | 12/62 | Papo | 235—176 |

OTHER REFERENCES

"Cryogenic Devices in Logical Circuitry and Storage," by J. W. Bremer, published in Electrical Manufacturing, February 1958.

"The Cryotron-A Superconductive Computer Component," by D. A. Buck, published in Proceedings of the IRE, April 1956.

IRVING L. SRAGOW, *Primary Examiner.*

EVERETT R. REYNOLDS, *Examiner.*